United States Patent [19]

Gliemeroth et al.

[11] Patent Number: 4,686,196
[45] Date of Patent: Aug. 11, 1987

[54] PHOTOTROPIC GLASS WITH A REFRACTIVE INDEX GREATER THAN OR EQUAL TO 1.59, AN ABBE NUMBER GREATER THAN OR EQUAL TO 44 AND A DENSITY LESS THAN OR EQUAL TO 3.0 G/CM³

[75] Inventors: Georg Gliemeroth, Mainz-Finthen; Ludwig Ross, Kelin-Winternheim; Uwe Eichhorn; Eva G. Hoelzel, both of Mainz-Finthen; Burkhard Speit, Mainz-Mombach, all of Fed. Rep. of Germany

[73] Assignee: Schott Glaswerke, Mainz, Fed. Rep. of Germany

[21] Appl. No.: 828,918

[22] Filed: Feb. 13, 1986

Related U.S. Application Data

[63] Continuation-in-part of Ser. No. 469,651, Feb. 25, 1983, abandoned.

[30] Foreign Application Priority Data

Feb. 26, 1982 [DE] Fed. Rep. of Germany ....... 3206958

[51] Int. Cl.⁴ .................................................. C03C 4/06
[52] U.S. Cl. ...................................... 501/13; 501/903
[58] Field of Search ................................ 501/13, 903

[56] References Cited

U.S. PATENT DOCUMENTS

| | | | |
|---|---|---|---|
| 2,566,134 | 8/1951 | Mockrin | 501/903 |
| 3,197,296 | 7/1965 | Eppler et al. | 501/903 |
| 3,630,765 | 12/1971 | Araujo | 501/13 |
| 3,898,093 | 8/1975 | Faulstich et al. | 501/903 |
| 3,923,529 | 12/1975 | Araujo et al. | 501/13 |
| 4,055,435 | 10/1977 | Sagara | 501/903 |
| 4,084,978 | 4/1978 | Sagara | 501/903 |
| 4,149,896 | 4/1979 | Faulstich et al. | 501/903 |
| 4,190,451 | 2/1980 | Hares et al. | 501/13 |
| 4,251,278 | 2/1981 | Hares | 501/13 |
| 4,358,542 | 11/1982 | Hares | 501/13 |
| 4,438,211 | 3/1984 | Mennemann et al. | 501/903 |
| 4,485,178 | 11/1984 | Gliemeroth et al. | 501/13 |
| 4,486,541 | 12/1984 | Gliemeroth et al. | 501/13 |

OTHER PUBLICATIONS

Gliemeroth, G. et al., Glastechnische Berichte 54(6), pp. 162-174.

Primary Examiner—William R. Dixon, Jr.
Assistant Examiner—Karl Group
Attorney, Agent, or Firm—Millen & White

[57] ABSTRACT

A phototropic glass with the optical characteristics of $n_d$ greater than to or equal to 1.59 and $v_d$ greater than or equal to 44, and with a density less than or equal to 3.0 g/cm$^{-3}$ is provided having a composition comprising:

| | |
|---|---|
| $SiO_2$ | 42–56 |
| $B_2O_3$ | 11–18 |
| $Al_2O_3$ | 0–5 |
| sum of $SiO_2$, $B_2O_3$, and $Al_2O_3$ | 55–75 |
| $Li_2O$ | 3–9 |
| $Na_2O$ | 0–7.98 |
| $K_2O$ | 0–8.22 |
| sum of alkaki metal oxides | 7–15 |
| MgO | 3–12 |
| CaO | 0–3 |
| SrO | 0–3 |
| BaO | 0–6 |
| ZnO | 0–2 |
| sum of alkali earth metal oxides amd ZnO | 3–12 |
| $TiO_2$ | 3.06–6.74 |
| $ZrO_2$ | 2–11 |
| $Nb_2O_5$ | 2.28–8 |
| $La_2O_3$ | 0–3 |
| $Er_2O_3$ | 0–1 |

18 Claims, No Drawings

PHOTOTROPIC GLASS WITH A REFRACTIVE INDEX GREATER THAN OR EQUAL TO 1.59, AN ABBE NUMBER GREATER THAN OR EQUAL TO 44 AND A DENSITY LESS THAN OR EQUAL TO 3.0 G/CM$^3$

CROSS REFERENCE TO RELATED APPLICATION

This application is a continuation-in-part of Ser. No. 469,651 filed on Feb. 25, 1983, abandoned, which disclosure is entirely incorporated by reference herein.

BACKGROUND OF THE INVENTION

This invention relates to a phototropic, light weight, highly refractive spectacle glass with a low dispersion.

Phototropic glasses are nowadays used predominantly in spectacles and are also finding increasing popularity in corrective prescription lenses for defective eyesight. For the correction of defective eyesight with spectacle glass which has a refractive index of 1.523, the spectacle lenses become progressively more voluminous at higher diopters (more serious sight defects); this means greater glass weight. For this reason, highly refractive but at the same time relatively light-weight lens-glasses have been sought and found; but every attempt at producing such lens-glasses also having good phototropic properties has so far failed to give the desired result. The reason for this lies in the composition of the highly refractive light-weight lens-glasses which does not enable the achievement of optimal precipitation of silver halide-containing zones in the glass by appropriate annealing conditions. This is essential for good phototropism. For silver halide-based phototropic glasses this phase separation is indispensable. Its quality determines the quality of phototropism.

If, for example, the conventional highly refractive, light weight glasses according to DE-PS 2 259 183 are melted with phototropic carriers, the result will be a white opaque substance which cannot be used for making spectacle glass.

The current state of the art is well represented in the field of highly refractive light-weight glasses by German No. PS 2 259 183 (U.S. Pat. No. 3,898,093), and in the field of phototropic glasses by DE-PS No. 2 404 752 (U.S. Pat. No. 4,108,674) and DE-PS No. 2 223 629(U.S. Pat No. 4,149,896).

Highly refractive phototropic glasses are likewise known but because of their heavy weight, they are of no interest for the purposes of the present invention.

A general review of conventional silver halide-containing phototropic glasses, insofar as they have properties which deviate from the standard refractive index for spectacle glasses of $n_d = 1.523$, has revealed that it would seem impossible to produce an $SiO_2$- containing phototropic glass with a refractive index equal to or greater than 1.59, an Abbe number equal to or greater than 40 and a density equal to or less than 3.2 g/cm$^3$. It is true that DE-OS No. 2 140 915 describes glasses with a relatively high refractive index, but these glasses must not contain $SiO_2$ because otherwise the product becomes opaque.

If this result is applied to the glasses according to DE-PS No. 2 259 183, the essential problem of producing highly refractive light-weight $SiO_2$-glasses with phototropic characteristics becomes readily apparent: the more highly refractive light-weight $SiO_2$-glasses, provided with the components silver and halogens, as well as phototropic highly refractive glasses, provided with $SiO_2$ for the purpose of stabilization and suitable for mass production, become clouded and eventually opaque.

The glasses according to DE-OS No. 2 140 915 moreover have density values over 3.2 g/cm$^3$. A review of the glasses according to DE-OS No. 2 256 775 revealed only glasses with refractive indices smaller than 1.59. A review of the glasses according to German OS No. 2 260 879 only showed glasses with densities higher than 3.2 g/cm$^3$.

A combination of the criteria: phototropism, low density, low dispersion and high refractive index, was achieved for the first time in DE AS No. 3 117 000.5 (U.S. Pat. No. 4,486,541), which describes a phototropic glass with the optical characteristics $n_d$ greater than or equal to 1.59, an Abbe number greater than or equal to 40 and a density less than or equal to 3.2 g/cm$^3$. However, this glass is still deficient, especially as regards its density, lower values being needed.

The Abbe number $$V_d = \frac{n_d - 1}{n_f - n_c}$$

is significant inasmuch as in the region of values less than 40, it is the cause of interfering color fringes appearing when the angle of view through the glasses is at an angle. This phenomenon is due to unduly high dispersion, i.e., excessively high wavelength dependency of the refractive index. Such color fringes must be avoided. Any further increase in the Abbe number yields an improvement in dispersion and thus in serviceability.

Another important aspect resides in practicability under conventional modern production conditions. Some raw materials, such as, for example, tantalum oxide, are so expensive nowadays that their use for the production of spectacle glasses is severely restricted even though, due to their effect on network formation, i.e., for the extremely important devitrification stability, they are of the greatest interest in the production process. Added to this is the fact that, for reasons of mass production in tank furnaces and automatic presses (viscosity and crystallization criteria), and $SiO_2$ content of at least 30% by weight is indispensible for this type of spectacle glass.

SUMMARY OF THE INVENTION

Accordingly it is an object of this invention to provide glasses with phototropic properties due to the presence therein of silver, halides and copper or other sensitizers equivalent to copper, and which have a refractive index $n_d$ equal to or greater than 1.59, an Abbe number equal to or greater than 44 and a density equal to or less than 3.0 g/cm$^3$, i.e., in general to ameliorate the disadvantages of prior art glasses.

Upon further study of the specification and appended claims, further objects and advantages of this invention will become apparent to those skilled in the art.

These objects have been attained by this invention by providing glass systems which comprise at least two network formers, for example $SiO_2$ and $B_2O_3$, or three network formers, e.g. $SiO_2$, $B_2O_3$ and $P_2O_5$.

More specifically, these objects have been achieved by glasses containing at least 80 mol. % in the glass system:

$SiO_2$—$R_2O_3$—$R_2O$—RO—$RO_x$—$R_2O_5$ in which
- $R_2O_3$ represents $Al_2O_3$, $B_2O_3$ or rare earth oxides, e.g., $Er_2O_3$, $Nd_2O_3$, $La_2O_3$ etc.
- $R_2O$ represents alkali metal oxides (e.g., of Na, K, Li, Rb, Cs),
- RO represents alkaline earth metal oxides (e.g., Mg, Ca, Sr, Ba), ZnO or PbO
- $RO_x$ represents $GeO_2$, $ZrO_2$, $TiO_2$, $SnO_2$ or $WO_3$ and
- $R_2O_5$ represents $Nb_2O_5$, or $P_2O_5$ and also contain silver, halides and sensitizers such as for example copper, in the conventional form of ionic compounds as phototropic carriers.

When the oxides defined above constitute less than 100 wt. % of the phototropic glass of this invention, suitable equivalent additives comprising the remainder (up to 20%) include the various conventional colorants mentioned herein, bismuth oxide, ytterbium oxide, yttrium oxide, erbium oxide (e.g., 0–1%), and other conventional phototropy compatible additives, including refining agents. For example, such glasses comprise in wt. % 90 on an oxide basis:

| | |
|---|---|
| $SiO_2$ | 42–56 |
| $B_2O_3$ | 11–18 |
| $Al_2O_3$ | 0–5 |
| sum of $SiO_2$, $B_2O_3$, and $Al_2O_3$ | 55–75 |
| $Li_2O$ | 3–9 |
| $Na_2O$ | 0–7.98 |
| $K_2O$ | 0–8.22 |
| sum of alkali metal oxides | 7–15 |
| MgO | 3–12 |
| CaO | 0–3 |
| SrO | 0–3 |
| BaO | 0–6 |
| ZnO | 0–2 |
| sum alkaline earth metal oxides and ZnO | 3–12 |
| $TiO_2$ | 3.06–6.74 |
| $ZrO_2$ | 2–11 |
| $Nb_2O_5$ | 2.28–8 |
| $La_2O_3$ | 0–3 |
| PbO | 0–2 |

$Er_2O_3$ as a component in 0–1% is typical of optional rare earth ingredients. The alkali metal oxide is preferably $Li_2O$, and optionally $Na_2$) and $K_2O$. Other ranges may be chosen independently, e.g., as follows:

| | |
|---|---|
| $SiO_2$ | 40–50 |
| $B_2O_3$ | 15–18 |
| $Al_2O_3$ | 2.9–3.5 |
| $Li_2O$ | 6.0–7.5 |
| $Na_2O$ | 0.06–0.08 |
| $K_2O$ | 2.7–3.0 |
| MgO | 4.0–5.0 |
| CaO | 1.5–2.0 |
| SrO | 0.0–0.1 |
| BaO | 4.5–5.5 |
| ZnO | 0.0–0.1 |
| $TiO_2$ | 4.5–5.5 |
| $ZrO_2$ | 3.0–3.5 |
| $Nb_2O_5$ | 5.0–7.0 |
| $La_2O_3$ | 0.0–0.1 |
| PbO | 0.1–0.5 |
| $Er_2O_3$ | 0.1–0.3 |

Where desired, various conventional colorants and/or other conventional phototropy compatible additives, including refining agents can be included.

Of course, all glasses of this invention also require the ingredients causing the phototropic effect: at least 0.05 wt. % $Ag_2O$, generally 0.05–2.0 wt. %, preferably 0.05–0.40 wt. %; 0 to 0.1 wt. % of cupric oxide or another conventional sensitizer, e.g., sulfur, cadmium oxide, and at least 0.25 wt. % halogens, generally 0.25–3.0 or 4.0 wt. %, preferably 0.25–1.9 wt. %.

Unless indicated otherwise herein, the phototropic component, per se, of the glass of this invention is selected using fully conventional consideration, e.g., as thoroughly discussed in G. Gliemeroth, U. Eichhorn, E. Hoelzel, Glastechnische Berichte 54 (1981) 6, 162–174, whose disclosure is incorporated by reference herein.

Compared to the prior art glasses, e.g., those of DAS No. 3 117 000.5, or U.S. Pat. No. 4,190,451, the glasses of the present invention represent a distinct and significant improvement. The density of lens glasses is of vital importance in regard to weight (considered in competition with plastic lenses) and every seemingly slight reduction in the first digit after the decimal point is very hard to achieve. A drop in density below 3.0 g/cm³ by comparison with densities around 3.2 g/cm³ secures for the first time the advantage that in all diopter ranges, with a refractive index of 1.59, all glasses are lighter in weight than those having a refractive index of 1.523. In addition to this, they have the added advantage of being thinner and therefore cosmetically more attractive. The attainment of such high refractive indices in photochromic glass of this type represents a major advance since it is not possible merely to add increasing amounts of index raisers due to the known adverse effects of increased amounts of such components on phototropy and/or other important glass properties, e.g., clarity, color, devitrification stability, etc., e.g., as discussed in U.S. Pat. No. 4,190,451.

DETAILED DISCUSSION

At least one component from the group $SiO_2$, $B_2O_3$ and $P_2O_5$ may be partly or wholly replaced on a molar basis by germanium oxide in an equivalent embodiment of the invention.

Herein, "rare earths" refer to the elements Ce, Pr, Nd, Pm, Sm, Eu, Gd, Tb, Dy, Ho, Er, Tm, Yb and Lu. The oxides of these elements are useful as possible additive components in equivalent glasses of this invention.

Unless indicated otherwise herein, all percent values are on an analysis basis.

As another component in equivalent glasses, the presence of $P_2O_5$ in a concentration of 0.01 to 10% by weight may have a beneficial influence in respect of the chemical stability of the phototropic glass.

The network formers in the basic glass, i.e., the components $SiO_2$, $B_2O_3$ and $Al_2O_3$ preferably are present in a concentration of 55 to 75% by weight in total. However, all glasses according to this invention normally should contain at least 42% by weight of $SiO_2$ with a view to facilitating mass production technology.

The present invention shows that the basic glass composition is also a vital factor for the quality of phototropism. It is only secondarily that the degrees of concentration of the phototropic carriers in the glass according to this invention affect the phototropic characteristics as follows.

The concentration of the phototropic carriers, considered additively over and above the basic glass composition, should be at least on the order of 0.05% by wt. for $Ag_2O$, at least on the order of 0.09% by wt. for bromine, at least on the order of 0.09% by wt. for chlorine and at least on the order of 0.003% by wt. for cupric oxide.

When the silver halide containing phototropic glasses according to this invention are exposed to actinic radiation, photolysis becomes effective in these silver halide containing precipitates. The silver which is created in this process grows into silver colloids and produces an absorption in the visible spectrum range. The system reverts to its initial state when the phototropic glass is no longer excited by appropriate radiation.

For the production of the phototropic glasses according to this invention and the controlled choice of their phototropic characteristics, it is not only necessary to introduce silver and halides as well as optional sensitizers, such as for example copper oxide into the glass, but, preferably, the glasses should also be subjected to a tempering treatment (tempering being here defined as heating the glasses to 500°–720° C. for a period of 26 hours to 10 minutes. The quality of the product is influenced by the chosen concentrations. Precise conditions can be routinely chosen for any given composition by conventional considerations, perhaps in conjunction with a few routine optimization experiments.

If the concentration of silver is too low in the presence of a sufficient quantity of halogens, the glass shows a clouding tendency during tempering. This clouding tendency decreases with increasing silver content and an increased darkening effect in irradiated condition will then be observed. However, if the silver concentration is chosen too high, a clouding tendency will already be noted in the untempered glass. Silver concentration also affects the kinetics of the phototropic process. These kinetics are poor with unduly low silver contents and improve with increasing silver concentration up to an optimal point upwards of which they deteriorate once more. The optimum silver concentration for any given glass composition can be ascertained in each case by a few routine preliminary tests, but should in any case not fall below 0.05% by weight in the analysis.

The halogens which are traditionally used are bromine and chlorine, but phototropic properties were found in the glasses according to this invention also if only one of the two above-mentioned halogens was used. Technically somewhat more complicated is the establishment of the appropriate halogen concentration inasmuch as the vapor pressures of these components at the smelting temperature are very high. However, selection can also be made by a few conventionally routine preliminary tests.

The effect of halogen concentration on the phototropic properties is similar to that of silver. Inadequate amounts of chlorine and/or bromine give rise to clouding in the tempered glass; the phototropic reaction is only very weak. The phototropic characteristics improve with rising halogen concentration, the kinetics improve likewise and darkening or blackening in irradiated condition decreases. If the halogen content is too high on the other hand, even the as yet untempered glass will display a clouding reaction.

Again, the correct concentration of the different halogens as well as their mutual ratio can be routinely ascertained by a few preliminary tests for every chosen composition of glasses according to this invention, but in any case the concentrations of bromine and chlorine should usually not fall below 0.09% by wt. for either of these components.

The introduction of CuO into a copper-free phototropic glass improves the kinetics of the phototropic process with increasing cupric oxide percentages. Over and above a certain level, an inferior darkening ability and higher temperature sensitivity is observed in the glass. Hence, the choice of copper concentration in the phototropic glass also vitally influences the kinetics and the attainable depth of darkening; it further influences the temperature sensitivity of the phototropic process. If the CuO content is less than 0.003% by weight, the kinetics seem to become too poor for ophthalmic use of the glasses.

Except as indicated otherwise herein, the glasses of this invention are prepared fully conventionally for phototropic glasses.

In order to obtain a brown coloration under light exposure, the glass may be doped with noble metals as is conventional. See, e.g., G. Gliemeroth, U. Eichhorn, E. Holzel, Glastechn. Ber. 54 (1981) 6, 162–174, whose disclosure is incorporated by reference herein.

In order to produce color tints in non-light-exposed condition, the glass may further be provided with a total of 1% by weight of secondary group metal oxides and/or a total of 5% by weight (additional), typically up to 1% coloring rare-earth metal oxides.

All glasses according to this invention may also be doped with coloring metal compounds such as NiO or CoO, etc. for permanent tinting using conventional considerations. Usually coloring oxides are contained in an amount of up to 2 wt. % in total.

As can be seen, the objects of this invention have been achieved, e.g., by providing a silver-halide-containing phototropic glass and which is distinguished from conventional phototropic lens glasses by its special suitability in regard to weight (=as low as possible) by its high quality of phototropism and by its high refractive index≧1.59, all achievable by the compositional formulae herein, e.g., in view of the ability of the glass to attain high refractive index e.g., by requisite contents of components such as $TiO_2$, $ZrO_2$ etc. due to unique interactions of other components, e.g., $Li_2O$.

A particularly noteworthy glass is expressed in % by weight on an oxide basis:

| | |
|---|---|
| $SiO_2$ | 42 to 56 |
| $B_2O_3$ | 11 to 18 |
| $Al_2O_3$ | 0 to 5 |
| sum of $SiO_2$, $B_2O_3$, $Al_2O_3$: | 55 to 74 |
| $Li_2O$ | 6 to 9 |
| $Na_2O$ | 0 to 6 |
| $K_2O$ | 0 to 6 |
| sum of the alkali metal oxides: | 7 to 15 |
| MgO | 3 to 10 |
| CaO | 0 to 3 |
| SrO | 0 to 3 |
| ZnO | 0 to 2 |
| sum of the alkaline earth metal oxides and ZnO: | 3 to 10 |
| $TiO_2$ | 3.06 to 5 |
| $ZrO_2$ | 2 to 5 |
| $Nb_2O_5$ | 4 to 8 | and which contains at least 0.05 $Ag_2O$, 0 to 0.1 of copper oxide or another sensitizer and at least 0.25 of halides.

One particularly good glass according to the present invention has the following composition, expressed in % by weight.

| | |
|---|---|
| SiO$_2$ | 49.50 |
| B$_2$O$_3$ | 14.00 |
| Al$_2$O$_3$ | 4.50 |
| ZrO$_2$ | 4.20 |
| Nb$_2$O$_5$ | 4.60 |
| CaO | 1.80 |
| MgO | 5.60 |
| ZnO | 0.80 |
| TiO$_2$ | 5.00 |
| Li$_2$O | 6.50 |
| K$_2$O | 0.75 |
| Ag$_2$O | 0.50 |
| CuO | 0.020 |
| Cl | 2.56 |
| Br | 1.115 |

This glass, having good phototropic properties, has a refractive index of 1.595, an Abbe number of 48 and a density of 2.58 g/cm$^3$.

Depending on the smelting process applied, differential evaporation conditions must be expected for the halogens and possibly also for the silver as is conventional. In a tank melt, the halogen-syntheses must be applied considerably lower as is known.

A further particularly suitable composition consists, in % by weight of the following:

| | |
|---|---|
| SiO$_2$ | 44.79 |
| B$_2$O$_3$ | 16.56 |
| Al$_2$O$_3$ | 3.12 |
| ZrO$_2$ | 2.40 |
| Nb$_2$O$_5$ | 5.85 |
| La$_2$O$_3$ | 2.02 |
| CaO | 1.59 |
| MgO | 4.50 |
| BaO | 3.80 |
| TiO$_2$ | 4.70 |
| Li$_2$O | 6.56 |
| Na$_2$O | 0.09 |
| K$_2$O | 3.94 |
| Ag$_2$O | 0.25 |
| CuO | 0.04 |
| Cl | 1.88 |
| Br | 0.38 |

Combined with good phototropic properties (ST=27%; RHWZ=2.3 min), this glass has a refractive index of 1.5950, an Abbe number of 48 and a density of 2.626 g/cm$^3$.

The most preferred glass of this invention is that of Example 11. Also preferred is that of Example 12.

The spectacle glasses according to this invention have a refractive index greater than or equal to 1.59, an Abbe number greater than or equal to 44 and a density less than or equal to 3.0 g/cm$^3$, good chemical stability and can be readily ground and polished like optical lens glasses.

All mentioned glasses according to this invention can be smelted with other than the stated amount of silver, halogen and copper concentrations in such a way as to vary the phototrophic properties thereof.

Unless indicated otherwise herein, for all optional ingredients, when they are included in the glass, they ere present in at least about 1 ppm. Moreover, for each of the content ranges listed herein, the endpoints can vary within the respective range by additive or subtractive amounts of, e.g., 0.5, 1.0, 1.5, 2.0, 2.5, 3.0, etc. wt. %. Thus, the amount of MgO for this invention can be 3.1, 3.2, 3.5, 3.6, 3.8, 4.5, 5.5 etc to 12 or 11.9, 11.8 etc; of Li$_2$O can be 3, 4, 5, 5.1, 5.2, 5.5, 5.6, 5.8 etc. to 8, 8.5, 8.6 etc; of TiO$_2$can be 3.06, 3.2, 3.4 etc. to 6, 6.3, 6.5 etc; of ZrO$_2$ can be 2.2, 2.4, 2.8, 2.9, 3.1, 3.5, 4.5 etc. to 9, 10, 10.2, 10.4, 10.5. 10.6 etc. Temperatures are set forth uncorrected in degrees Celsius; unless otherwise indicated, all parts and percentages are by weight.

The following example illustrates the production of a glass according to this invention. (Example No. 1 of table 1).

| frit composition | |
|---|---|
| 743.61 g | ground quartz-powder |
| 372.33 g | boric acid |
| 89.29 g | aluminium-monohydrate |
| 63.16 g | zirconium oxide |
| 69.11 g | niobium oxide |
| 243.15 g | lithium carbonate |
| 36.37 g | soda |
| 1.49 g | sodium bromide |
| 37.06 g | sodium chloride |
| 75.08 g | titanium oxide |
| 9.46 g | silver nitrate |
| 0.30 g | copper oxide |
| 16.54 g | potassium carbonate |
| 48.13 g | calcium carbonate |
| 195.35 g | magnesium carbonate |
| 12.07 g | zinc oxide |
| 2012.50 g | |

The frit components are weighed out and mixed. The frit is placed into a 1 1-platinum crucible at 1315° C. and smelted down. The melt is then refined at 1335° C., cooled down to 1200° C. and homogenized by stirring for 20 minutes. The melt is then rolled to form 4 mm thick, 70 mm wide billets.

Heat treatment is applied at 600° C. for 1 hour in a furnace with air circulation, followed by cooling to room temperature at a cooling rate of 40 K/min.

In this glass the following characteristic data were measured:

| | |
|---|---|
| refractive index n$_d$ | 1.5946 |
| dispersion v$_d$ | 48.14 |
| density D | 2.635 g/cm$^3$. |

Measurements of phototropic characteristic data taken at 20° C. from a 2mm thick glass sample showed a saturation transmissivity of 24%, a
recovery half-time of 2.8 minutes and a
transmission of 86% after 30 minutes recovery time.

Table 1 shows other examples of glasses according to this invention in % by weight. Silver oxide, chlorine, bromine and cupric oxide were added to all of these glasses in the synthesis.

In Table 1: n$_d$ is the refractive index D density in g/cm$^{-3}$, v$_d$ is the Abbe number, $\alpha$ is the linear thermal expansion coefficient times 10$^7$, Tg is the transformation temperature, E$_w$ is the softening temperature, RHWZ is the recovery-half-time in minutes following a standard irradiation for 15 minutes with 80,000 lux xenon light in the course of which saturation transmission ST in % (measured at 545 nm) was reached. $\tau$R 30 is the transmission value in % reached by the glass after 30 min. recovery. All phototropic data were obtained from 2 mm thick test pieces at 20° C.

TABLE 1

| No. | 1 | 2 | 3 | 4 | 5 | 6 | 7 | 8 | 9 | 10 | 11* | 12* |
|---|---|---|---|---|---|---|---|---|---|---|---|---|
| $SiO_2$ | 49.50 | 52.00 | 52.90 | 49.50 | 49.50 | 49.95 | 49.50 | 47.01 | 45.43 | 44.79 | 45.03 | 45.97 |
| $B_2O_3$ | 14.00 | 15.00 | 15.30 | 14.00 | 14.00 | 13.93 | 14.00 | 13.52 | 16.71 | 16.56 | 16.87 | 16.73 |
| $Na_2O$ | 2.75 | 2.75 | 2.75 | — | 0.75 | 3.81 | 0.75 | 2.84 | 0.52 | 0.09 | 0.07 | 0.13 |
| $K_2O$ | 0.75 | 0.75 | 0.75 | 0.75 | 0.75 | 2.90 | 0.75 | 2.84 | 5.24 | 3.94 | 2.95 | 2.62 |
| $Li_2O$ | 6.50 | 7.00 | 7.00 | 6.50 | 6.50 | 6.90 | 6.50 | 8.84 | 6.65 | 6.56 | 6.67 | 6.57 |
| CaO | 1.80 | 1.70 | 1.80 | 1.80 | 1.80 | — | 1.80 | — | 1.64 | 1.59 | 1.59 | 1.54 |
| MgO | 5.60 | 5.00 | 5.00 | 5.60 | 5.60 | 8.06 | 5.60 | 11.13 | 5.22 | 4.50 | 4.57 | 4.05 |
| ZnO | 0.80 | 0.80 | 0.70 | 0.80 | 0.80 | 0.62 | — | 0.62 | — | — | — | — |
| BaO | — | — | — | — | — | — | — | — | — | 3.80 | 5.0 | 5.10 |
| $Al_2O_3$ | 4.50 | 1.20 | — | 4.50 | 4.50 | — | 4.50 | 1.04 | 3.23 | 3.12 | 3.21 | 3.06 |
| $TiO_2$ | 5.00 | 5.00 | 5.00 | 5.00 | 5.00 | 5.73 | 5.00 | 3.06 | 5.34 | 4.70 | 4.82 | 4.80 |
| $ZrO_2$ | 4.20 | 4.20 | 4.20 | 4.20 | 4.20 | 3.79 | 4.20 | 4.72 | 3.89 | 2.40 | 3.10 | 3.01 |
| $Nb_2O_5$ | 4.60 | 4.60 | 4.60 | 4.60 | 4.60 | 4.09 | 4.60 | 4.07 | 6.06 | 5.85 | 6.04 | 5.86 |
| $La_2O_3$ | — | — | — | — | — | — | — | — | — | 2.02 | — | — |
| $Ag_2O$ | 0.43 | 0.30 | 0.27 | 0.50 | 0.50 | 0.18 | 0.50 | 0.20 | 0.35 | 0.25 | 0.19 | 0.13 |
| CuO | 0.02 | 0.010 | 0.003 | 0.020 | 0.020 | 0.004 | 0.012 | 0.025 | 0.040 | 0.040 | 0.050 | 0.046 |
| Cl | 1.50 | 1.20 | 0.80 | 2.56 | 2.12 | 0.40 | 2.12 | 0.44 | 2.37 | 1.88 | 1.69 | 1.18 |
| Br | 0.09 | 0.40 | 0.36 | 1.15 | 0.95 | 0.32 | 0.95 | 0.35 | 0.53 | 0.38 | 0.25 | 0.18 |
| $n_d$ | 1.5964 | 1.5971 | 1.5956 | 1.5905 | 1.5950 | 1.5992 | 1.5951 | 1.5943 | 1.5978 | 1.6007 | 1.6221 | 1.6198 |
| $v_d$ | 48.14 | 48.51 | 48.78 | 48.44 | 48.32 | 47.78 | 48.29 | 51.87 | 46.89 | 47.98 | 47.89 | 46.68 |
| α | 77.2 | 77.0 | 77.0 | 73.0 | 73.8 | 87.5 | 72.5 | 84.6 | 77.5 | 77.0 | 66.20 | 67.89 |
| Tg | 501 | 501 | 499 | 507 | 505 | 489 | 503 | 500 | 490 | 499 | 504 | 502 |
| $E_w$ | 623 | 622 | 620 | 625 | 626 | 606 | 624 | 620 | 615 | 623 | 628 | 630 |
| D | 2.635 | 2.636 | 2.630 | 2.630 | 2.585 | 2.650 | 2.5860 | 2.650 | 2.612 | 2.693 | 2.628 | 2.615 |
| ST | 24 | 26 | 25 | 29 | 31 | 27 | 27 | 29 | 14.3 | 16.3 | 29 | 32 |
| RHWZ | 2.8 | 2.7 | 2.8 | 1.9 | 2.3 | 2.3 | 1.5 | 2.0 | 6.0 | 6.8 | 2.6 | 2.4 |
| τR 30 | 86 | 81 | 84 | 88 | 83 | 83 | 85 | 81 | 77.9 | 72.0 | 81 | 82 |

*PbO-0.35 $Er_2O_3$-0.19
*PbO-0.27 $Er_2O_3$-0.21

The preceding examples can be repeated with similar success by substituting the generally or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A phototropic glass in which the carriers of phototropism are precipitates containing silver, halogens and optional phototropy sensitizers and which has a refractive index $n_d$ equal to or higher than 1.59, an Abbe number equal to or greater than 44 and a density equal to or less than 3.0 g/cm³, consisting essentially of in % by weight on an oxide basis:

| | |
|---|---|
| $SiO_2$ | 42–56 |
| $B_2O_3$ | 11–18 |
| $Al_2O_3$ | 0–5 |
| sum of $SiO_2$, $B_2O_3$, and $Al_2O_3$ | 55–75 |
| $Li_2O$ | 3–9 |
| $Na_2O$ | 0–7.98 |
| $K_2O$ | 0–8.22 |
| sum of alkali metal oxides | 7–15 |
| MgO | 3–12 |
| CaO | 0–3 |
| SrO | 0–3 |
| BaO | 0–6 |
| ZnO | 0–2 |
| sum alkali earth metal oxides and ZnO | 3–12 |
| $TiO_2$ | 3.06–6.74 |
| $ZrO_2$ | 2–11 |
| $Nb_2O_5$ | 2.28–8 |
| $La_2O_3$ | 0–3 |
| PbO | 0–2 |
| $Er_2O_3$ | 0–1 | the total of the foregoing oxides being 100 wt. %, and in addition, phototropically effective amounts of $Ag_2O$, a halogen and optional phototropy sensitizers.

2. A phototropic glass of claim 1, consisting essentially of, in % by weight on an oxide basis:

| | |
|---|---|
| $SiO_2$ | 42 to 56 |
| $B_2O_3$ | 11 to 18 |
| $Al_2O_3$ | 0 to 5 |
| sum of $SiO_2$, $B_2O_3$, $Al_2O_3$: | 55 to 74 |
| $Li_2O$ | 6 to 9 |
| $Na_2O$ | 0 to 6 |
| $K_2O$ | 0 to 6 |
| sum of the alkali metal oxides: | 7 to 15 |
| MgO | 3 to 10 |
| CaO | 0 to 3 |
| SrO | 0 to 3 |
| ZnO | 0 to 2 |
| sum of the alkaline earth metal oxides and ZnO: | 3 to 10 |
| $TiO_2$ | 3.06 to 5 |
| $ZrO_2$ | 2 to 5 |
| $Nb_2O_5$ | 4 to 8 |

3. A phototropic glass in which the carriers of phototropism are precipitates containing silver, halogens and optional phototropy sensitizers and which has a refractive index $n_d$ equal to or higher than 1.59, an Abbe number equal to or greater than 44 and a density equal to or less than 3.0 g/cm³, consisting essentially of, in % by weight on an oxide basis:

| | |
|---|---|
| $SiO_2$ | 40–50 |
| $B_2O_3$ | 15–18 |
| $Al_2O_3$ | 2.9–3.5 |
| $Li_2O$ | 6.0–7.5 |
| $Na_2O$ | 0.06–0.08 |
| $K_2O$ | 2.7–3.0 |
| MgO | 4.0–5.0 |
| CaO | 1.5–2.0 |
| SrO | 0.0–0.1 |
| BaO | 4.5–5.5 |
| ZnO | 0.0–0.1 |

-continued

| | |
|---|---|
| TiO$_2$ | 4.5–5.5 |
| ZrO$_2$ | 3.0–3.5 |
| Nb$_2$O$_5$ | 5.0–7.0 |
| La$_2$O$_3$ | 0.0–0.1 |
| PbO | 0.1–0.5 |
| Er$_2$O$_3$ | 0.1–0.3 | the total of the foregoing oxides being 100 wt. %, and in addition, phototropically effective amounts of Ag$_2$O, a halogen and optional phototropy sensitizers.

4. A phototropic glass of claim 1, wherein the phototropic components are at least 0.05 wt. % of Ag$_2$O, at least 0.25 wt. % of halogens, and 0 to 0.1 wt. % of copper oxide or an equivalent amount of another phototropy sensitizer.

5. A phototropic glass of claim 2, wherein the phototropic components are at least 0.05 wt. % of Ag$_2$O, at least 0.25 wt. % of halogens, and 0 to 0.1 wt. % of copper oxide or an equivalent amount of another phototropy sensitizer.

6. A phototropic glass of claim 1, which is doped with an amount of a noble metal effective for achieving brown coloration when the phototropic glass is exposed to actinic radiation.

7. A phototropic glass of claim 1, whose carrier of the phototropism, in addition to the basic glass composition, consists essentially of:

| | |
|---|---|
| Ag$_2$O | at least 0.05% by weight, |
| bromine | at least 0.09% by weight, |
| chlorine | at least 0.09% by weight, and |
| copper oxide | at least 0.003% by weight. |

8. A phototropic glass of claim 2, whose carrier of the phototropism, in addition to the basic glass composition, consists essentially of:

| | |
|---|---|
| Ag$_2$O | at least 0.05% by weight, |
| bromine | at least 0.09% by weight, |
| chlorine | at least 0.09% by weight, and |
| copper oxide | at least 0.003% by weight. |

9. A phototropic glass of claim 4, whose carrier of the phototropism, in addition to the basic glass composition, consists essentially of:

| | |
|---|---|
| Ag$_2$O | at least 0.05% by weight, |
| bromine | at least 0.09% by weight, |
| chlorine | at least 0.09% by weight, and |
| copper oxide | at least 0.003% by weight. |

10. A phototropic glass of claim 2, which is doped with an amount up to 2% by weight of a coloring oxide effective to color the glass in the unirradiated state.

11. A spectacle lens consisting essentially of the phototropic glass of claim 1.

12. A spectacle lens consisting essentially of the phototropic glass of claim 2.

13. A spectacle lens consisting essentially of the phototropic glass of claim 3.

14. A spectacle lens consisting essentially of the phototropic glass of claim 4.

15. A phototropic glass of claim 1, consisting essentially of the following composition:

| | |
|---|---|
| SiO$_2$ | about 45.03 |
| B$_2$O$_3$ | about 16.87 |
| Na$_2$O | about 0.07 |
| K$_2$O | about 2.95 |
| Li$_2$O | about 6.67 |
| CaO | about 1.59 |
| MgO | about 4.57 |
| ZnO | about — |
| BaO | about 5.0 |
| Al$_2$O$_3$ | about 3.21 |
| TiO$_2$ | about 4.82 |
| ZrO$_2$ | about 3.10 |
| Nb$_2$O$_5$ | about 6.04 |
| La$_2$O$_3$ | about — |
| PbO | about 0.35 |
| Er$_2$O$_3$ | about 0.19 |
| Ag$_2$O | about 0.19 |
| CuO | about 0.050 |
| Cl | about 1.69 |
| Br | about 0.25 |
| [PbO | about 0.35 |
| ErO | about 0.19] |

16. A phototropic glass of claim 1, consisting essentially of the following composition:

| | |
|---|---|
| SiO$_2$ | about 45.97 |
| B$_2$O$_3$ | about 16.73 |
| Na$_2$O[3] | about 0.13 |
| K$_2$O | about 2.62 |
| Li$_2$O | about 6.57 |
| CaO | about 1.54 |
| MgO | about 4.05 |
| ZnO | about — |
| BaO | about 5.10 |
| Al$_2$O$_3$ | about 3.06 |
| TiO$_2$ | about 4.80 |
| ZrO$_2$ | about 3.01 |
| Nb$_2$O$_5$ | about 5.86 |
| La$_2$O$_3$ | about — |
| PbO | about 0.27 |
| Er$_2$O$_3$ | about 0.21 |
| Ag$_2$O | about 0.13 |
| CuO | about 0.046 |
| Cl | about 1.18 |
| Br | about 0.18 |
| [PbO | about 0.27 |
| Er$_2$O$_3$ | about 0.21] |

17. A spectacle lens consisting essentially of the phototropic glass of claim 15.

18. A spectacle lens consisting essentially of the phototropic glass of claim 16.

* * * * *